No. 691,164. Patented Jan. 14, 1902.
G. W. McGILL.
FASTENING DEVICE.
(Application filed Mar. 7, 1901.)
(No Model.) 2 Sheets—Sheet 1.
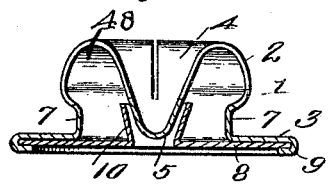
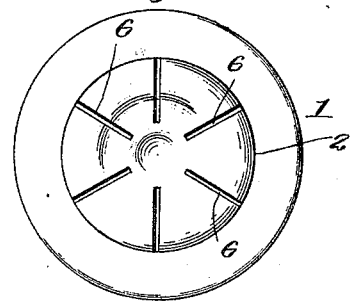
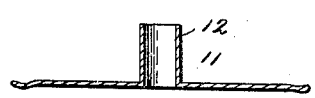
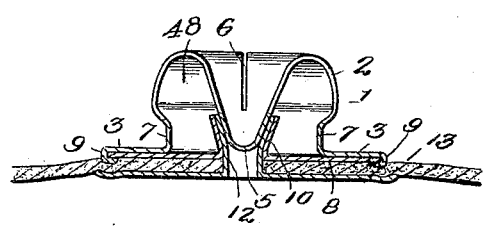
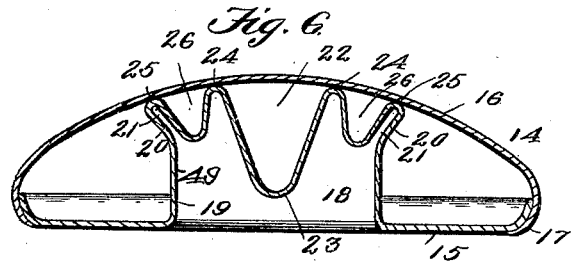
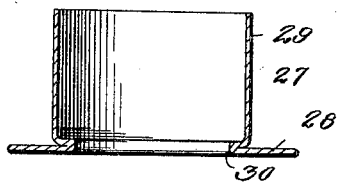
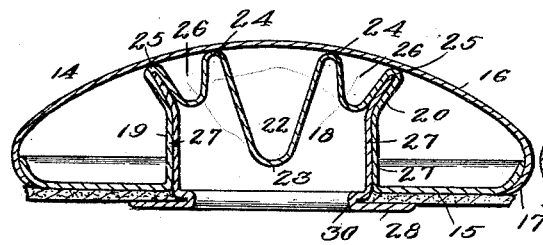
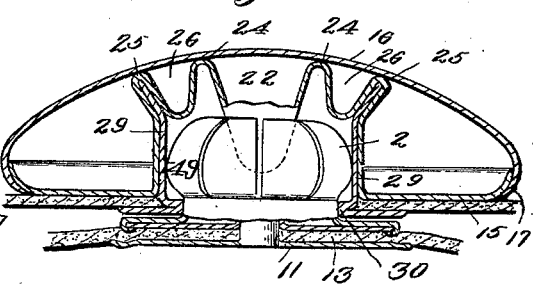
Witnesses:
Inventor
George W. McGill
By James L. Norris
Atty.

No. 691,164. Patented Jan. 14, 1902.
G. W. McGILL.
FASTENING DEVICE.
(Application filed Mar. 7, 1901.)

(No Model.) 2 Sheets—Sheet 2.

Witnesses:
C. L. Kesler
W. B. Keefer

Inventor
George W. McGill.
By James L. Norris
Atty.

UNITED STATES PATENT OFFICE.

GEORGE W. McGILL, OF RIVERDALE-ON-THE-HUDSON, NEW YORK.

FASTENING DEVICE.

SPECIFICATION forming part of Letters Patent No. 691,164, dated January 14, 1902.

Application filed March 7, 1901. Serial No. 50,237. (No model.)

*To all whom it may concern:*

Be it known that I, GEORGE W. MCGILL, a citizen of the United States, residing at Riverdale-on-the-Hudson, New York city, in the county of New York and State of New York, have invented new and useful Improvements in Spring-Buttons or Fastening Devices, of which the following is a specification.

My invention relates to spring-buttons or fastening devices for leather purses, umbrellas, and other articles of that class in which stud and socket members are employed adapted to be inserted one within the other and to interlock with each other.

The object of the invention is to provide cooperating engaging means on the two members independent of the locking means for preventing lateral displacement of one of said members with respect to the other.

A further object of the invention is to provide means on the stud member whereby increased strength and resilience in the spring portion may be obtained and a more reliable snap or locking action between the stud and socket members effected.

A further object of the invention is to provide on the socket member increased cap-supporting strength and means for spreading and retaining in position the radiating spring-sections of the stud member, and thereby increasing the locking action thereof.

A further object of the invention is to provide improved means for attaching the two members of the button or fastening device to the fabric or article of apparel on which the same are to be used.

A further object of the invention is to reduce the number of parts of which the stud and socket members are made and to provide means for preventing lateral or horizontal turning movement of said members when the same are in locking relation to each other.

Other objects and advantages of the invention will hereinafter appear, and the novel features thereof will be set forth in the claims.

Figure 12:
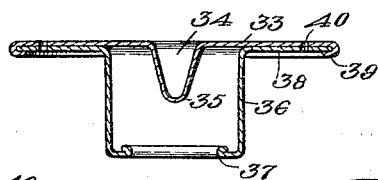
Figure 10:
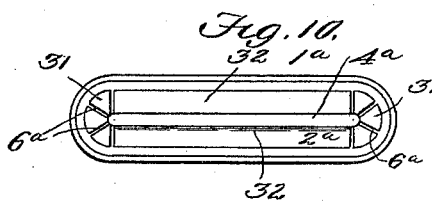
Figure 11:
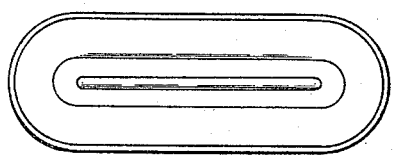
Figure 13:
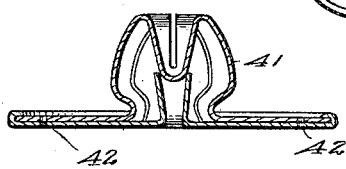
Figure 14:
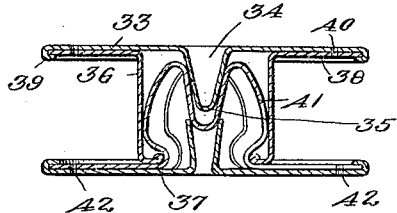
Figure 15:
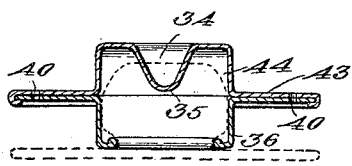
Figure 16:
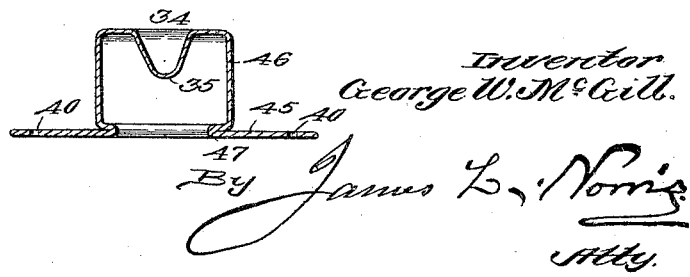

In the drawings forming a part of this specification, Figure 1 is a plan view of the stud member. Fig. 2 is a vertical section of the same through two of the radiating slots therein. Fig. 3 is a sectional view of the base-plate or disk thereof. Fig. 4 is a similar view of the eyelet for attaching the stud member to the cloth or fabric. Fig. 5 is a sectional view showing the stud member applied to the cloth or fabric. Fig. 6 is a sectional view of the socket member. Fig. 7 is a similar view of the eyelet for attaching the same to the cloth or fabric. Fig. 8 is a similar view showing the socket member applied. Fig. 9 is a sectional view showing the stud and socket members attached to the fabric and in interlocking relation to each other. Figs. 10 and 11 are plan views of the stud and socket members, respectively, the same being shown elongated in shape. Figs. 12 and 13 are sectional views of modified constructions of the socket and stud members, respectively. Fig. 14 is a sectional view of the same, showing the parts in interlocking relation. Figs. 15 and 16 show other modifications of the socket member.

Like reference-numerals indicate like parts in the different views.

The stud member 1 of my improved button or fastening device is made from a disk of sheet metal struck up to form the stud 2 and the base-flange 3. The stud 2 is struck or spun inwardly at its center to form a central reëntrant conoidal-shaped cavity 4 on the outside or upper surface thereof and an anvil 5 of conoidal shape on the inside or lower surface thereof, with a covered annulus 48 between its annular wall and the dependent wall of such conoidal-shaped reëntrant cavity, said walls being in curved and integral connection at their top, providing an arched cover or roof to the annulus between and dividing them. The lowermost point of the anvil 5 lies in substantially the same plane with the base-flange 3, and the stud 2 is formed with a plurality of vertically-disposed radially-arranged slots 6, providing for the compression of the outer and inner or concentric walls of the stud 2. The said stud 2 is formed with a substantially cylindrical portion or neck 7 at a point adjacent to the base-flange 3, and from said cylindrical portion or neck it bulges outwardly, forming a bulging upper portion or head to provide an engaging portion on its outer surface. By providing the reëntrant cavity 4 in the stud 2 the said stud is annular, and when the same is pressed inwardly it acts against the resiliency of the two parts or concentric walls of the curved metal of which it is formed—that is to say, when the stud 2 is laterally compressed the resistance to be overcome is that offered by the material of said stud forming its concentric connected walls or from the cylindrical portion or neck 7 of said stud to its upper fold forming its annular top or crown and that offered by the resiliency of the material from the upper fold or head of said stud down to the anvil 5. When, therefore, the lateral compression of said stud is relieved, said stud returns to its normal outward position by the springing outwardly of the arms formed by the slots 6 and the springing upwardly of the inner part of the stud above the anvil 5. To the under side of the flange 3 is secured a base-plate 8, the same being held in place by crimping or upsetting the edge of the base-flange 3 around or over the edge of the base-plate 8, as shown at 9. At the center of the base-plate 8 is an upwardly-projecting annular extension or collar 10, which embraces the anvil 5 of the stud 2 and serves to hold said stud in proper position with respect to the base-plate 8—that is to say, through the engagement of the anvil 5 with the extension 10 lateral movement of the anvil 5 and of the stud 2 as a whole is prevented. As shown, the upper end of the tubular extension 10 is flared outwardly to conform to the shape of the anvil 5. The flange 3 and the plate 8 unitedly constitute the base of the stud member. When it is desired to attach the stud member 1 to the cloth or fabric to which it is to be applied, an opening is cut in the cloth of a size corresponding to the base diameter of the extension 10, and the base of the stud member is placed against the cloth, with the opening in the latter lying opposite said extension 10. The eyelet 11 is now brought into use. The same is preferably of the same diameter as the base of the stud member 2 and is formed with a central tubular extension 12. This extension 12 is inserted through the opening in the cloth or fabric 13 from the side thereof opposite that on which the stud member 1 is placed and forced up into the extension 10 of the base-plate 8. In so doing the upper edges of the extension 12 come in contact with the anvil 5 and are spread or flared outwardly, so that they lie in close contact with the inner surface of the flared extension 10 on the base-plate 8. Said eyelet 11 is in this manner secured to the base-plate 8, and the stud member as a whole is firmly attached to the cloth or fabric 13. Danger of accidental displacement of the parts is thereby effectually prevented. Of course when the eyelet 11 is being forced into its place the anvil-head of a setting-tool is introduced into the reëntrant cavity 4, so as to prevent the bending of the anvil 5 by the engagement of the extension 12 therewith.

The socket member 14, which coöperates with the stud member 1, consists of a base-plate 15 and a crown or cap 16, the latter being secured to the former by crimping or upsetting the edge of the same thereon, as shown at 17. The base-plate 15 is struck up at its center to form a central cavity 18, having a dome 49, side walls 19, flaring outward at their top, as shown at 20, and that portion of the dome connecting therewith bent inwardly and downwardly to form the inclined anvil-groove 21 and then upwardly and again downward and inwardly to form a central depression or cavity 22, the under side of which constitutes an engaging portion 23 and annular supporting ribs or flanges 24 25, separated by an annular groove or depression 26. The ribs or projections 24 25 of the dome engage the inner surface of the crown 16 and serve as a support therefor to prevent the bending or collapsing of said crown. The part 23, formed by the inwardly-extending cavity or recess 22, constitutes an engaging portion which fits within the cavity 4 in the stud member 1 when the two members are in interlocking relation with each other and prevents, independent of the main locking means, the lateral displacement of one member with respect to the other, requiring a direct vertical movement to secure their separation. The socket member 14 is attached to the cloth or fabric by means of an eyelet 27, consisting of a base 28, a tubular extension 29 at the center thereof, and an inwardly-projecting annular bead 30 between the flange 28 and the extension 29. The bead 30 forms a contracted throat for the socket member and provides a shoulder against which the stud 2 bears when the two members of the device are in locking relation one to the other. An opening is cut or otherwise formed in the cloth opposite the cavity 18 in the socket member 14, and the extension 29 of the eyelet 27 is introduced through this opening and into the cavity 18. When the upper edges of the extension 29 come in contact with the lower surface of the upper wall of the anvil-groove 21, the same are forced outwardly or flared until they assume a position within said groove 21. When in this position, the eyelet 27 is locked to the extension 19 of the base 15 and the socket member 14 as a whole is firmly attached to the cloth or other fabric.

When the two members of my device are attached to the cloth or fabric in the manner described, they may be interlocked one with the other by forcing the stud 2 through the contracted throat 30 and into the cavity 18 in the socket member 14. In passing through the contracted throat of the socket member formed by the bead 30, the stud 2 is laterally compressed; but as soon as the same passes beyond the throat 30 and into the cavity 18 it springs out automatically and the bulged portion or head of said stud engages the shoulder formed by the bead 30 and prevents the two members of the device from being accidentally separated one from the other. As the stud 2 has its resiliency given to it by its radially-slotted concentric and integral annular walls and also by the spreading action of the engaging portion 23 of the socket member on the radiating spring members of the stud, when the stud and socket members are in locking engagement a greater spring action and a more secure locking action is obtained with the same weight of metal than can be obtained in similar fastenings otherwise constructed, and this without interfering with the easy and immediate vertical separation of the members when desired. Furthermore, by reason of the fact that the different sections of the stud 2, formed by the slots 6 therein, are integral with each other, with the anvil 5, and with the base-flange 3 greater rigidity and lasting properties or qualities of the device are obtained.

In the form of my invention illustrated in Figs. 10 and 11 of the drawings the two parts of my fastening device are shown as oblong in shape with rounded ends. The stud member 1ª has the stud 2ª, formed with the slots 6ª, radiating from the center of its semicircular ends, forming the radiating spring portions 31 and the intermediate, elongated, imperforate, straight, and parallel spring portions 32 on opposite sides of the reëntrant cavity 4ª. The socket member 14ª is shaped to conform to the stud member 1ª and is similar in all respects to the socket member 14, heretofore described, except that it is elongated instead of round. This construction of my device operates in the same manner as that illustrated in Figs. 1 to 9 of the drawing, but by reason of the fact that the parts are elongated in shape horizontal or lateral turning movement of one with respect to the other is effectually prevented. Furthermore, the locking force exerted by one of the parts on the other is increased by reason of the increase in the extent of frictional contact between the two.

In the modified form of my invention illustrated in Figs. 12, 13, and 14 of the drawings only two pieces of metal are used in the construction of the respective members. The base-plate 33 of the socket member is formed with a downwardly-extending central cavity 34, the under side 35 of which constitutes an engaging portion corresponding to the engaging portion 23 of the socket member in the preferred form of my invention. To this base-plate 33 is secured a socket-piece provided with a downwardly-projecting tubular extension 36, having an inwardly-crimped lower end 37, constituting the contracted throat for the socket and the shoulder against which the coöperating stud engages. The base-plate 33 is secured to the socket-piece by crimping or upsetting the edges thereof around the edges of the flange 38 of said socket-piece, as shown at 39. The flange 38 and base-plate 33 are provided with openings 40, by means of which the socket member may be stitched to the cloth or other fabric. Any other equivalent attaching means, however, may be substituted for these openings.

The stud 41 of the stud member is substantially the same as the stud 1 in my preferred construction, the difference being that said stud is somewhat more elongated vertically, so as to properly fit within the extension 36 of the socket member, and the base of said stud member is provided with openings 42, by means of which said stud member may be sewed to the cloth or fabric. When the two parts of the device are in place, as shown in Fig. 14 of the drawings, the projection 35 on the base-plate 33 of the socket member fits within the cavity in the upper end of the stud 41 and prevents, independent of the locking means between these two parts, the lateral displacement of one with respect to the other, and otherwise acts in the same manner as the corresponding part in the preferred form of the invention.

In the construction of the socket member illustrated in Fig. 15 of the drawings the base-plate 43 is struck up at its center to form a cavity 44 and is then bent downwardly to form a cavity 34 and an engaging portion 35 within the cavity 44. The said base-plate 43 is secured to a socket-piece similar to that illustrated in Fig. 12 of the drawings.

In Fig. 16 of the drawings the socket-piece 36 is dispensed with altogether, and instead the base-plate 45 is struck up at its center to form the cavity 46, and then bent inwardly to form the cavity 34, with the engaging portion 35 on the opposite side thereof, substantially as shown in Fig. 15 of the drawings. In addition to what is shown in Fig. 15, however, there is provided an inwardly-extending bead 47 on the base-plate 45, which constitutes the contracted throat of the cavity 46 and serves as a shoulder against which the stud member bears when the two parts are in interlocking relation.

In all forms of my invention the stud 2 and the parts with which the same coöperates may be of circular, elliptical, or other suitable shape in plan or cross-section. When said stud and the socket in which it fits are elliptical or elongated, turning movement of the stud in its socket is effectually prevented.

Having thus described my invention, what I claim as new, and desire to secure by Letters Patent, is—

1. In a spring-button or fastening device, the combination with a stud member having a reëntrant cavity in the stud thereof, provided with a closed base or lower end constituting an anvil, of a socket member adapted to receive said stud and having an inwardly-extending engaging portion adapted to fit within said cavity, and a securing device for said stud member having a tubular portion adapted to be spread outwardly by said anvil.

2. In a spring-button or fastening device, the combination with a stud member having a reëntrant cavity in the stud thereof provided with a closed base or lower end constituting an anvil, of a socket member adapted to receive said stud and having an inwardly-extending recess or cavity forming an engaging portion adapted to fit within the cavity in said stud, and a securing device for said stud member having a tubular portion adapted to be spread outwardly by said anvil, as and for the purpose set forth.

3. In a spring-button or fastening device, the combination with a stud member having a reëntrant cavity in the stud thereof provided with a closed lower end which tapers inward and forms an anvil, of a socket member adapted to receive said stud and having an inwardly-extending cavity therein forming a projection or engaging portion which fits within the cavity in said stud, a securing device for said stud member having a tubular portion adapted to be spread outwardly by said anvil, and interlocking means between said stud and socket members, as and for the purpose set forth.

4. In a spring-button or fastening device, a stud member having a conoidal-shaped reëntrant cavity in the stud thereof, providing a covered annulus between the wall of such stud and the wall of the reëntrant cavity, such cavity decreasing in diameter from its mouth toward its base where it is closed, the outer surface of such closed base forming an anvil, conoidal in form, on which may be upset or spread the tubular end of an attaching-eyelet, and which also serves to retain the stud in correct vertical and lateral position in its member; the upper portion of the walls, and the roof connecting the same, of such covered annulus, provided with a plurality of horizontally and vertically disposed and radially-arranged slots dividing such parts into a plurality of looped spring-sections radially disposed around said cavity.

5. In a spring-button or fastening device, a stud member provided with a plurality of compressible arched spring-sections radially disposed around the inner circumference of an encircling base-flange and the outer circumference or upper part of a conoidal-shaped hollow anvil central to such sections, each of said sections having their two respective ends in webbed connection with such flange and anvil, respectively, providing a stud having an outside cylindrical lower part or neck, and a bulging upper part or head projecting laterally outward above said neck, and having the central top part or crown of such head depressed in manner to provide a central reëntrant cone-shaped cavity or socket within the same, the walls of such cavity converging from its mouth toward and terminating in a conoidal or cup shaped bottom of lesser diameter than such mouth, and said cavity or socket adapted to receive the correspondingly-shaped dependent and engaging portion of a socket member.

6. In a spring-button or fastening device, a stud member provided with a plurality of compressible arched spring-sections radially disposed around the inner circumference of an encircling base-flange and the outer circumference or upper portion of a conoidal-shaped hollow anvil central to such sections, each of said sections having its two respective ends in webbed connection with such flange and anvil, respectively, providing a stud having an outside cylindrical lower part or neck, and a bulging upper part or head projecting laterally outward above said neck, and having the central top part or crown of such head depressed in manner to provide a central reëntrant cone-shaped cavity or socket within the same, said cavity or socket adapted to receive internally the central and correspondingly-shaped dependent engaging portion of a socket member, and the conoidal-shaped imperforate base of such socket adapted to serve externally as an anvil on which to upset or spread the tubular part of an attaching-eyelet.

7. In a spring-button or fastening device, the combination with a socket member, of a stud member, comprising a base-plate having an upwardly-projecting tubular extension at the center thereof having flaring upper ends, and a laterally-compressible stud secured to said base-plate and having radial slots and a reëntrant cavity therein forming on its under side an anvil which lies within the flaring upper ends of said extension, and an eyelet for securing said stud member in place, the same having a tubular extension thereon adapted to be forced against said anvil and spread out into contact with the flaring upper ends of the extension on said base-plate.

8. In a spring-button or fastening device, the combination with a socket member, of a stud member comprising a base-plate having an upwardly-projecting tubular extension thereon provided with a flaring upper end, and a stud part laterally compressible, secured to said base-plate and covering the same and having a central reëntrant cavity or socket and radial slots therein, the lower end of the material of which said cavity is formed, being imperforate and fitting in and surrounded by the flared upper end of said base-plate extension.

9. In a spring-button or fastening device, the combination with a stud member having a reëntrant cavity in the stud thereof provided with a closed lower end or imperforate bottom, of a socket member comprising a base-plate struck up to form a cavity or socket to receive said stud having its crown part further struck and folded to form diverging annular grooves, two annular cap-supporting ridges and a central dependent conical engaging portion adapted to fit within the cavity in said stud.

10. In a spring-button or fastening device, the combination with a stud member provided with a reëntrant central cavity therein having an imperforate base part, of a socket member comprising a base-plate and a crown-piece or cap secured to said base-plate, said base-plate having struck up thereon a central tubular cavity, the lower part of the annular walls of which stand at right angles to the base or flange of such plate and the upper part of such walls fashioned or folded to form a flaring annular groove for the reception of the upper part of a button receiving and attaching eyelet and as a support to the crown-piece, and the material forming the rest of the top of such cavity folded inward and upward to form an additional crown-supporting annular concentric rib and a depressed central cone forming an engaging portion which fits within the cavity in said stud member.

11. In a spring-button or fastening device, the combination with a stud member having a plurality of annularly-arranged looped or bowed spring-sections, the two concentric arms of which are in bridged connection at their top and connected at their bottoms, respectively, with the outer base-flange of such member and the lower portion of its conoidal-shaped and centrally-located anvil, of a socket member provided with means for pressing toward each other the concentric arms of the loops forming such spring-sections while the stud occupies its interlocking position in its socket member, thereby reinforcing the resilience which holds the stud therein.

12. In a spring-button or fastening device, the combination with a stud member having a reëntrant cavity with an imperforate base in the stud thereof, of a socket member, and of an eyelet for securing said socket member in place, said socket member comprising a base-plate having a cavity or socket therein for receiving said attaching-eyelet and said stud, and a crown or cap secured at its edges to said base-plate, the material of said base-plate from which the cavity or socket therein is formed being struck up and bent inwardly and outwardly to form a central dependent engaging portion and a plurality of annular concentric ribs or projections surrounding the same, one of which forms a groove in which the top of the attaching-eyelet is spread and clenched, and all as annular concentric supports for said crown or cap, and the central dependent engaging portion adapted to occupy the reëntrant cavity in said stud and assist in maintaining the stud in engaged or locked position in the socket member.

13. In a spring-button or fastening device, the combination with a stud member having a cavity therein, of a socket member comprising a base-plate, and a crown or cap, the said base-plate having a cavity therein provided with a dome having dependent from its inner center an engaging portion to fit within the cavity in said stud member, and having an annular diverging or angularly-arranged anvil-groove in its cavity concentric with such dependent portion, the said groove forming on its opposite side an annular rib or projection which serves as a support for said crown or cap, and an eyelet for securing said socket member in place, the same having a tubular extension thereon whose upper end is adapted to be forced into engagement with the walls of said annular groove and be thereby spread out into said groove.

14. In a spring-button or fastening device, the combination with a stud member having a cavity therein, of a socket member comprising a base-plate and a crown or cap secured thereto, the said base-plate being struck up at its center to form a cavity having an inclined annular anvil-groove around the sides thereof and a dependent engaging portion central with said groove adapted to fit within the cavity in said stud member, the said groove forming on its opposite side an annular rib or projection which serves as a support for said crown or cap, and an eyelet for securing said socket member in place, the same having a base-flange, a central tubular extension and an inwardly-extending bead between said flange and said extension, the upper end of said extension adapted to be forced into engagement with the walls of said anvil-groove and to be thereby spread out into said groove.

15. In a spring-button or fastening device, a stud member made from a disk of sheet metal struck up to form an annular projection or stud having a reëntrant cavity sunk in the center thereof, such cavity terminating in an imperforate base or bottom forming an anvil of conoidal shape, and a base-flange outside the stud, the said stud being radially slotted to form a plurality of looped spring-sections, said sections being integral with each other, with said flange and with the imperforate conoidal-shaped anvil forming the bottom of said cavity, the opposite ends of each of said sections leading respectively from said surrounding outside base-flange, and from the said centrally-located conoidal-shaped anvil.

16. In a spring-button or fastening device, an elongated stud member having an outer base-flange and an elongated stud projecting from its central part, said stud having an elongated reëntrant cavity centrally sunk in its top part giving to the stud an elongated annular hollow semitubular crown or ridge formation having rounded ends, and sides straight and parallel with each other, said rounded ends being divided by vertical slots into a plurality of curved radiating spring-sections, and the straight sides forming two straight parallel spring-sections, all of said sections connecting integrally at their base with the outer surrounding base-flange of the member and the inner imperforate base part of its reëntrant cavity, respectively; and a similarly-shaped socket member comprising a base-plate having an elongated cavity therein for receiving the similarly-shaped tubular part of an eyelet for securing said socket member in place and for receiving said elongated stud, and a crown or cap secured at its periphery to the corresponding part of the base-plate of such socket member, the material of said base-plate from which the cavity therein is formed being struck up and bent inwardly and outwardly to form a central elongated dependent engaging portion and a plurality of elongated annular concentric ribs or projections surrounding said engaging portion, one of which serves as an anvil on which the top of the attaching-eyelet is spread and clenched and all as elongated annular concentric supports for said crown or cap, the elongated central dependent engaging portion adapted to occupy the correspondingly-shaped reëntrant cavity in the stud and assist in securely maintaining the stud in engaged or locked position in said socket member.

In testimony whereof I have hereunto set my hand in presence of two subscribing witnesses.

GEORGE W. McGILL.

Witnesses:
W. HARRY McGILL,
THOMAS H. BAROWSKY.